US012808318B2

(12) United States Patent
Jeong et al.

(10) Patent No.: US 12,808,318 B2
(45) Date of Patent: Nov. 24, 2026

(54) RESERVOIR TANK AND COOLANT MODULE INCLUDING THE SAME

(71) Applicant: Hanon Systems, Daejeon (KR)

(72) Inventors: Seong Woo Jeong, Daejeon (KR); Jungbum Choi, Daejeon (KR); Gwang Ok Ko, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 24 days.

(21) Appl. No.: 19/008,714

(22) Filed: Jan. 3, 2025

(65) Prior Publication Data

US 2025/0223919 A1 Jul. 10, 2025

(30) Foreign Application Priority Data

Jan. 4, 2024 (KR) ........................ 10-2024-0001249

(51) Int. Cl.

| | |
|---|---|
| ***F01P 11/02*** | (2006.01) |
| ***G01F 23/56*** | (2006.01) |
| ***G01F 23/58*** | (2006.01) |
| ***G01F 23/60*** | (2006.01) |
| ***G01F 23/62*** | (2006.01) |
| ***G01F 23/64*** | (2006.01) |
| ***G01F 23/66*** | (2006.01) |
| ***G01F 23/68*** | (2006.01) |
| ***G01F 23/70*** | (2006.01) |
| ***G01F 23/72*** | (2006.01) |
| ***G01F 23/74*** | (2006.01) |

(52) U.S. Cl.

CPC ............ *F01P 11/029* (2013.01); *G01F 23/56* (2013.01); *G01F 23/58* (2013.01); *G01F 23/60* (2013.01); *G01F 23/603* (2013.01); *G01F 23/606* (2013.01); *G01F 23/62* (2013.01); *G01F 23/64* (2013.01); *G01F 23/66* (2013.01); *G01F 23/665* (2013.01); *G01F 23/68* (2013.01); *G01F 23/683* (2013.01); *G01F 23/686* (2013.01); *G01F 23/70* (2013.01); *G01F 23/703* (2013.01); *G01F 23/706* (2013.01); *G01F 23/72* (2013.01); *G01F 23/74* (2013.01); *F01P 2025/70* (2013.01)

(58) Field of Classification Search

None

See application file for complete search history.

(56) References Cited

U.S. PATENT DOCUMENTS

| | | | | |
|---|---|---|---|---|
| 4,475,290 A * | 10/1984 | Colditz | G01F 23/66 | 73/314 |
| 2010/0006577 A1* | 1/2010 | Koshino | F01P 11/029 | 220/501 |
| 2010/0206882 A1* | 8/2010 | Wessels | F01P 11/029 | 220/562 |

FOREIGN PATENT DOCUMENTS

| | | |
|---|---|---|
| KR | 20180099007 A | 9/2018 |

* cited by examiner

*Primary Examiner* — Atif H Chaudry

(74) *Attorney, Agent, or Firm* — NORTON ROSE FULBRIGHT US LLP

(57) ABSTRACT

The present disclosure relates to a reservoir tank for storing coolant and a coolant module including the same and relates to a reservoir tank and a coolant module, which have a baffle inside the reservoir tank to improve noise performance and coolant circulation performance and are formed to restrict the upward movement of a floating member using the baffle to improve manufacturing convenience.

11 Claims, 11 Drawing Sheets

RESERVOIR TANK AND COOLANT MODULE INCLUDING THE SAME

CROSS REFERENCE TO RELATED APPLICATION

The present application claims priority to Korean Patent Application No. 10-2024-0001249, filed Jan. 4, 2024, the entire contents of which is incorporated herein for all purposes by this reference.

BACKGROUND OF THE INVENTION

Field of the Invention

The present disclosure relates to a reservoir tank for storing coolant and a coolant module including the same, and the reservoir tank according to the present disclosure may be applied to vehicles including hybrid electric vehicles, fuel vehicles, and pure electric vehicles and may also be applied to other fields such as household or industrial applications.

Description of the Related Art

Electric vehicles or hybrid electric vehicles are provided with power electronics (PE) components (e.g., a motor and the like) including a motor, an inverter, an onboard charger (OBC), and the like and also provided with a battery for providing power to the PE components.

Since the PE components and batteries generate heat during operation, they need to be essentially cooled to protect the components and ensure durability. To this end, electric vehicles or hybrid electric vehicles are provided with a water-cooled PE cooling system for cooling the PE components and a water-cooled battery cooling system for cooling the battery.

To operate such a cooling system, a reservoir tank in which coolant is stored is provided, and miniaturization of the coolant module has been required to mount the reservoir tank and the coolant module in a narrow engine room.

Conventional coolant modules are indirectly connected to a reservoir tank and a pump through a hose, and even when the pump suctions coolant, there is no problem of air inside the reservoir tank being suctioned together, but as a method of directly connecting the reservoir tank to the pump without a separate hose emerges to miniaturize the coolant module, the air inside the reservoir tank flows into the pump along with the coolant, resulting in a problem of deteriorated performance of the pump and a problem of increased noise of the reservoir tank due to momentary lack of coolant.

Related Art Document

Patent Document (Patent Document 1) Korean Laid-Open Patent No. 10-2018-0099007 (published on 2018 Sep. 5)

SUMMARY OF THE INVENTION

One aspect of the present disclosure is directed to providing a reservoir tank in which a level of coolant stored inside the reservoir tank may be checked.

One aspect of the present disclosure is also directed to providing a reservoir tank with improved manufacturing convenience because a separate mold for fixing a water level sensor is not required.

Another aspect of the present disclosure is directed to providing a coolant module with improved coolant circulation performance.

The present disclosure relates to a reservoir tank in which a level of stored coolant is detected and provides a reservoir tank including a housing forming a body of the reservoir tank and storing the coolant therein, a baffle disposed inside the housing to partition an internal space of the housing into an upper space and a lower space, and a water level sensor that detects a level of the coolant, wherein the water level sensor has a floating member that moves upward and downward according to the level of the coolant and a sensing member that detects the floating member, and the upward movement of the floating member is restricted by the baffle.

The housing may include a lower housing forming a lower portion of the body of the reservoir tank and an upper housing forming an upper portion of the body of the reservoir tank, an inlet into which the coolant flows may be formed in the upper housing, and an outlet through which the coolant is discharged may be formed in the lower housing.

An installation part in which the sensing member is installed may be provided in a predetermined area of the outer surface of the lower housing, the floating member may be disposed inside the lower housing, and a guide that guides the upward and downward movement of the floating member may be formed to extend from an inner surface of the lower housing.

The guide may be formed to extend vertically in a height direction from the inner surface of the lower housing.

The baffle may be disposed inside the lower housing, and the guide may be formed to extend to a position at which the baffle is disposed so that one surface of the baffle is in contact with an end of the guide.

When a length of the sensing member to detect the floating member is L and a height from a part on which the baffle is installed to a surface on which the sensing member is installed is H, H may be smaller than L.

A bracket that fixes the sensing member to the sensing member may be provided on the installation part, and at least a part of the sensing member may be fitted into the bracket.

A circumference of the baffle may be formed to correspond to an inner circumference of the lower housing so that the baffle is coupled to the lower housing in a height direction.

The baffle may be formed in a thin plate shape to prevent air of the upper space from being mixed with coolant and discharged through the outlet.

A plurality of protrusions protruding from the inner wall to an inside of the lower housing may be formed in the lower housing, and a plurality of slots having a predetermined depth upward may be formed in the baffle, and the plurality of protrusions may be each inserted into one of the plurality of slots to couple the lower housing to the baffle.

The upper housing may be coupled to the lower housing in a height direction.

A mounting part to be coupled to a vehicle may be formed in the lower housing.

The present disclosure relates to a coolant module including a reservoir tank and may include the reservoir tank and a pump that circulates coolant stored in the reservoir tank, and a coolant outlet of the reservoir tank may communicate with an inlet of the pump.

DETAILED DESCRIPTION OF THE INVENTION

Hereinafter, the present disclosure will be described in detail with reference to the accompanying drawings. However, this is merely illustrative, and the present disclosure is not limited to specific embodiments described exemplarily.

A reservoir tank 1000 according to one embodiment of the present disclosure may be applied to vehicles including hybrid electric vehicles, fuel vehicles, and pure electric vehicles, may also be applied to other heat exchange fields such as household or industrial applications, and may also be used in some equipment requiring cooling.

Figure 1:
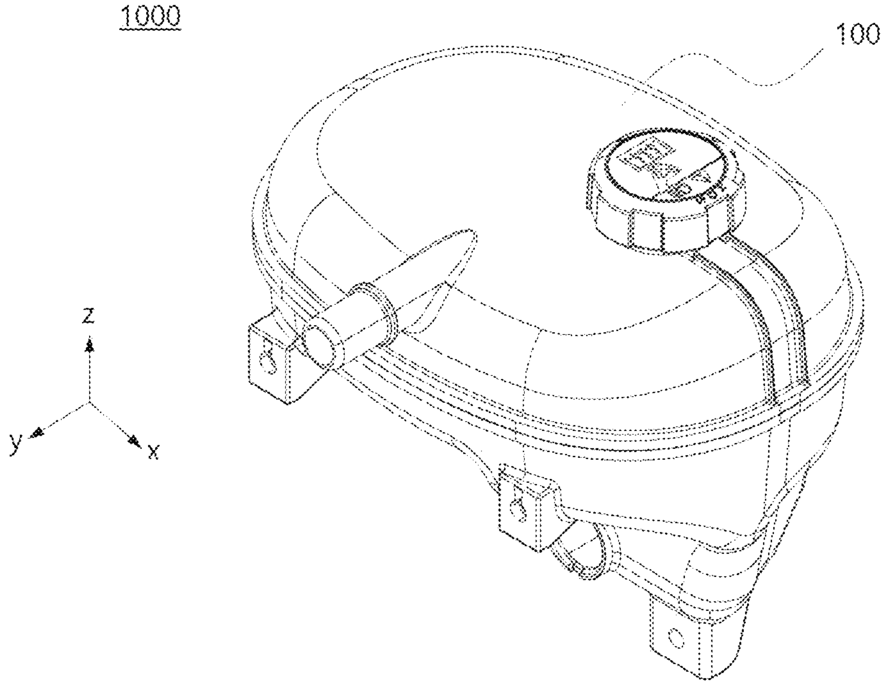
FIG. 1 is a perspective view illustrating a reservoir tank according to one embodiment of the present disclosure.
Figure 2:
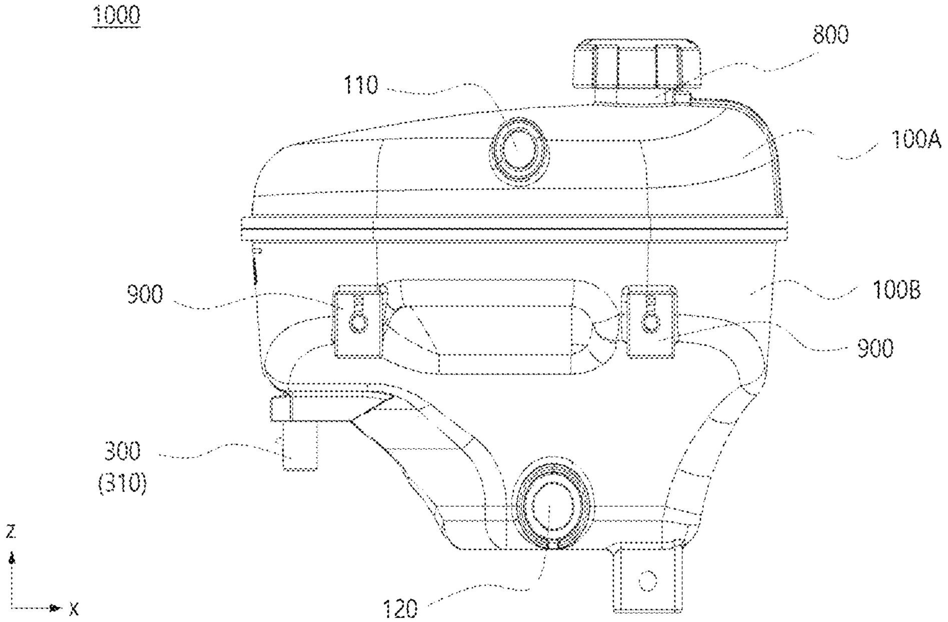
FIG. 2 is a view illustrating FIG. 1 in a y direction.
Figure 3:
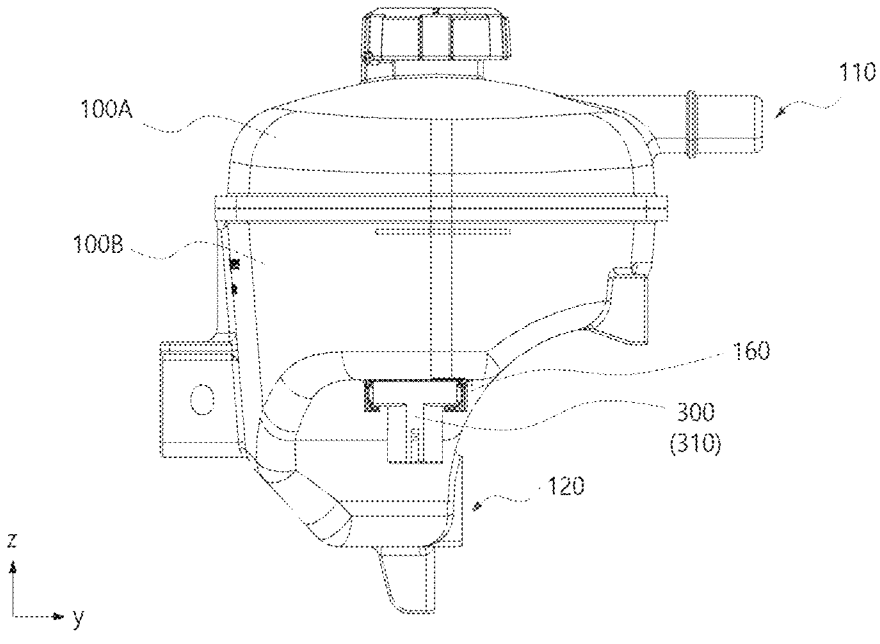
FIG. 3 is a view illustrating FIG. 1 in an x direction.

Hereinafter, the reservoir tank 1000 according to one embodiment of the present disclosure will be described with reference to FIGS. 1 to 3. FIGS. 1 to 3 are a perspective view, a front view, and a side view of the reservoir tank 1000, respectively.

The reservoir tank 1000 according to one embodiment of the present disclosure may include a housing 100, a baffle 200, and a water level sensor 300.

The housing 100 may form a body of the reservoir tank and may be formed to have a hollow therein to store coolant inside the hollow. The housing 100 may include an upper housing 100A forming an upper portion of the body of the reservoir tank and a lower housing 100B forming the body of the reservoir tank, an inlet 110 into which coolant flows may be formed in the upper housing 100A, and an outlet 120 through which the coolant is discharged may be formed in the lower housing 100B.

That is, the coolant may be introduced into the inlet 110, stored in the reservoir tank 1000, and then discharged through the outlet 120. In this case, a constant level of the coolant stored in the reservoir tank 1000 may be preferably maintained in terms of noise and coolant circulation performance, and the corresponding content will be described below.

The upper housing 100A and the lower housing 100B may be coupled in a height direction (a z direction), and the upper housing may be coupled to the lower housing to form a hollow space, and coolant may be stored in the hollow space.

To circulate the coolant, the inlet 110 into which coolant flows and the outlet 120 through which the coolant is discharged may be formed in the housing 100, and in addition, a coolant injection port 800 for supplementing coolant may be further formed, and the coolant injection port may be sealed through a cap.

According to one embodiment of the present disclosure, the reservoir tank 1000 may include the water level sensor 300 to detect whether the level of the coolant is sufficient, and when determining that the level of the coolant is lower than a reference amount due to leakage of the coolant or the like, the water level sensor 300 may notify a user of such a situation, and the user may inject coolant through the coolant injection port 800 to maintain an appropriate level of the coolant.

Meanwhile, the reservoir tank according to one embodiment of the present disclosure may further include a mounting part 900 to mount the reservoir tank 1000 on the vehicle. The mounting part 900 is formed in the lower housing 100B to stably support a weight of a lower end portion in which the coolant is stored. Furthermore, a hole is formed in the mounting part 900 to hang the hole at a specified position of the vehicle so that the reservoir tank 1000 may be coupled to the vehicle.

Figure 4:
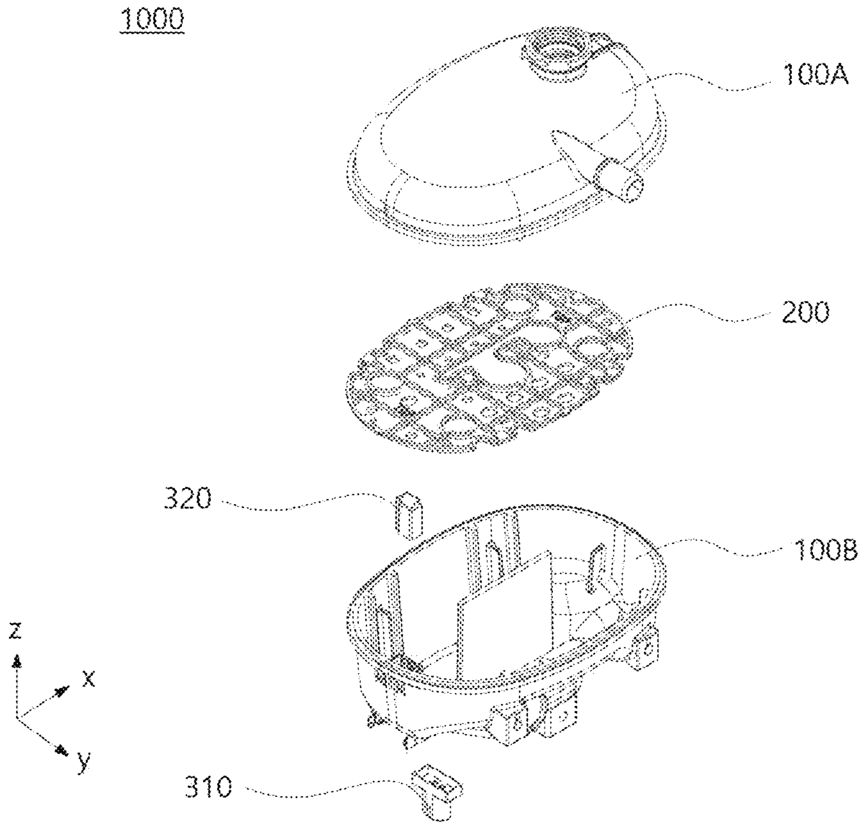
FIG. 4 is an exploded perspective view illustrating the reservoir tank according to one embodiment of the present disclosure.
Figure 5:
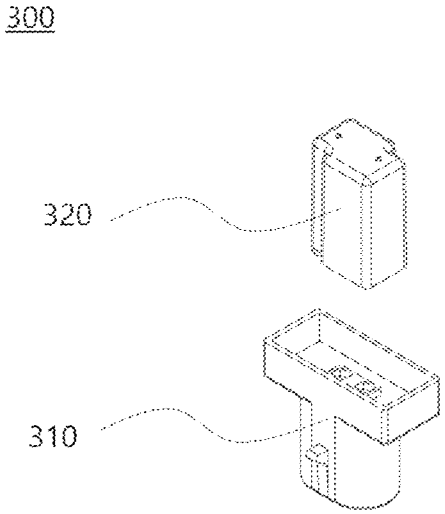
FIG. 5 is a schematic view illustrating a water level sensor according to one embodiment of the present disclosure.

Hereinafter, the baffle and the water level sensor will be described with reference to FIGS. 4 and 5. FIG. 4 is an exploded perspective view of the reservoir tank 1000 according to one embodiment of the present disclosure, and FIG. 5 is a schematic view illustrating the water level sensor 300.

The baffle 200 may be disposed inside the housing to partition an internal space of the housing into an upper space P1 and a lower space P2. When the coolant flows into the reservoir tank 1000, the coolant is stored from the lower space, and the water level may gradually increase, and the level of the coolant may be preferably positioned above the baffle 200.

The baffle 200 may be disposed inside the housing to reduce internal noise of the reservoir tank, and the coolant circulation performance can be improved by allowing the coolant stored inside the reservoir tank 1000 to be discharged through the outlet 120 without air mixing.

The reservoir tank 1000 may include the water level sensor 300 to detect the level of the coolant stored therein, and the water level sensor may include a floating member 320 that moves upward and downward according to the level of the coolant, and a sensing member 310 for detecting the floating member 320.

The floating member 320 may be provided inside the housing and moved upward and downward by the buoyancy of the coolant, and the sensing member 310 may be provided outside the housing and may detect the degree to which the floating member 320 is spaced apart from the sensing member 310 to detect the level of the coolant. For example, the floating member 320 may be provided with a magnet, and the degree to which the sensing member 310 is spaced apart from the floating member 310 may be detected according to a change in magnetic force to detect the level of the coolant.

Figure 6:
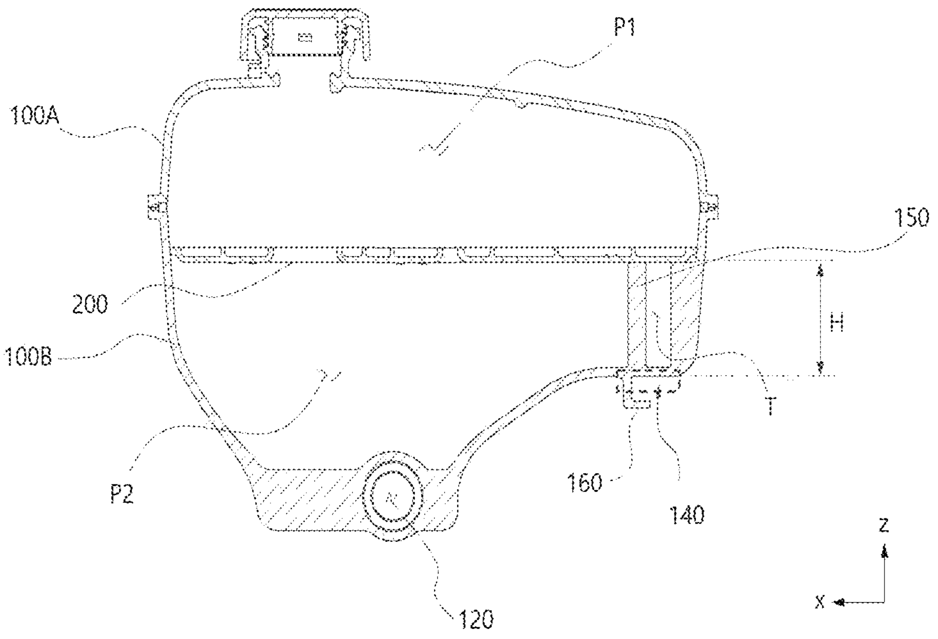
FIG. 6 is a cross-sectional view of the upper housing 100A, the lower housing 100B, and the baffle 200.
Figure 7:
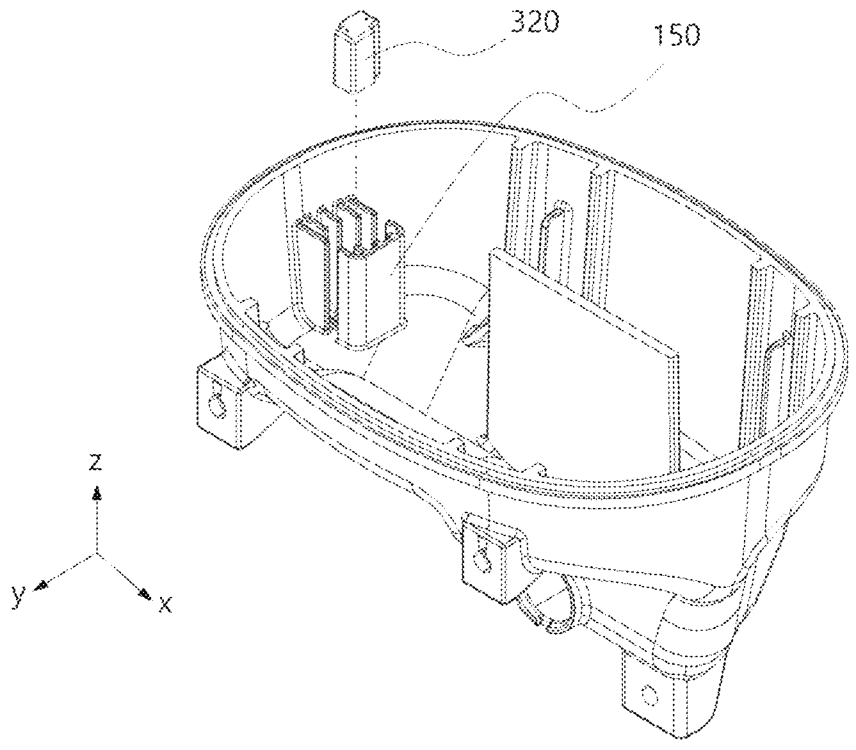
FIG. 7 is a view illustrating a state in which the floating member 320 is inserted into the lower housing 100B.
Figure 8:
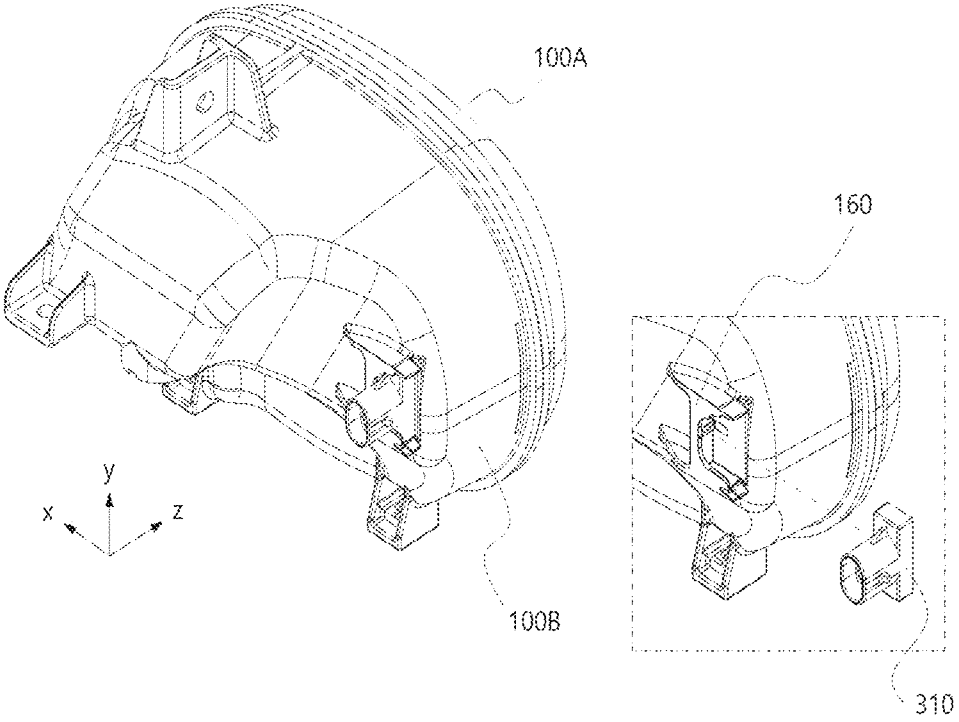
FIG. 8 is a view illustrating a state in which the lower housing 100B is coupled to the sensing member 310.

Next, the water level sensor will be described in detail with reference to FIGS. 6 to 8. FIG. 6 is a cross-sectional view of the upper housing 100A, the lower housing 100B, and the baffle 200, FIG. 7 is a view illustrating a state in which the floating member 320 is inserted into the lower housing 100B, and FIG. 8 is a view illustrating a state in which the lower housing 100B is coupled to the sensing member 310.

Since the floating member 320 may be moved upward and downward by the buoyancy of the coolant, there is a need for a means for separately guiding the floating member 320 or restricting the upward movement of the floating member 320 inside the reservoir tank to prevent the floating member 320 from floating freely within the stored coolant.

Conventionally, a method of restricting the upward movement of the floating member by providing a separate clip material inside the reservoir tank has been adopted, but according to one embodiment of the present disclosure, the upward movement of the floating member 320 may be restricted by the baffle 200 disposed inside the housing. Accordingly, a separate mold for implementing the clip material is not required, thereby reducing a manufacturing cost, and the structure of inserting the floating member 320 into the lower housing 100B and then fixing the floating member 320 to the lower housing 100B using a separate clip material is unnecessary, thereby improving assembly convenience.

Specifically, the sensing member 310 may be installed on at least a part of an outer surface of the lower housing. Hereinafter, an area in which the sensing member 310 is installed is referred to as an installation part 140. The installation part 140 may be preferably provided in a flat area of the lower surface of the lower housing in terms of the accuracy of detection of the floating member 320 of the sensing member 310.

In order for the sensing member 310 to detect the floating member 320, it is preferable that the sensing member 310 and the floating member 320 be disposed on the same axis and the floating member 320 moves upward and downward along the axis. Accordingly, a guide 150 that forms a passage T guiding the upward and downward movement of the floating member 320 may be provided on the inner surface of the lower housing 100B corresponding to the installation part 140.

The guide 150 may be formed to extend vertically from the inner surface of the lower housing in the height direction (the z direction) to guide the floating member 320 to move upward and downward in the height direction (the z direction) according to the level of the coolant. The guide 150 is formed to extend to a position at which the baffle 200 is disposed so that one surface of the baffle 200 may be in contact with an end of the guide 150.

That is, the floating member 320 may move upward and downward along the passage T formed by the guide 150, and a maximum upward movement position of the floating member 320 may be determined by the baffle 200. The one surface of the baffle 200 is formed to be in contact with the end of the guide 150 so that the floating member 320 may move upward and downward without departing from the passage T.

Meanwhile, since the sensing member 310 may detect the magnetic force of the floating member 320 to detect the level of the coolant, when the floating member 320 is spaced a predetermined distance from the sensing member 310, the magnetic force cannot be detected, thereby causing a sensing error.

To prevent such a sensing error, when a length range in which the sensing member 310 may detect the floating member 320 is L, and a height from the part on which the baffle 200 is disposed to a surface on which the sensing member 310 is installed is H, H may be smaller than L.

A bracket 160 that fixes the sensing member 310 to the lower housing may be provided on the outer surface of the lower housing corresponding to the installation part 140. At least a part of the sensing member 310 may be fitted into the bracket 160 so that the sensing member 310 may be coupled to the lower housing 100B.

Figure 9:
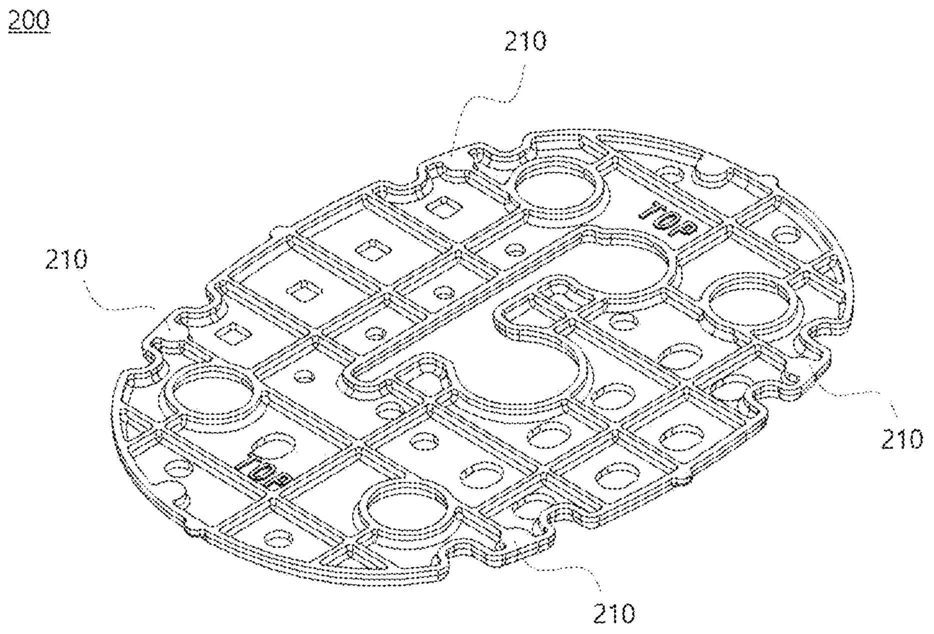
FIG. 9 is a perspective view illustrating a baffle according to one embodiment of the present disclosure.

Since the sensing member 310 is fitted into the bracket 160, the sensing member 310 may be stably coupled with the lower housing 100B even in unstable situations such as vibrations caused by the operation of the vehicle, thereby reducing the sensing error of the level of the coolant. Next, the baffle 200 and the lower housing 100B will be described with reference to FIGS. 9 to 11. FIG. 9 is a perspective view of the baffle 200 according to one embodiment of the present disclosure, FIG. 10 illustrates a state before the baffle 200 is inserted into the lower housing 100B, and FIG. 11 illustrates a state after the baffle 200 is inserted into the lower housing 100B.

The baffle 200 is a means that is inserted into the lower housing 100B to partition the inside of the reservoir tank into the upper space P1 and the lower space P2 and may be formed to correspond to an inner circumference of the lower housing 100B.

Figure 10:
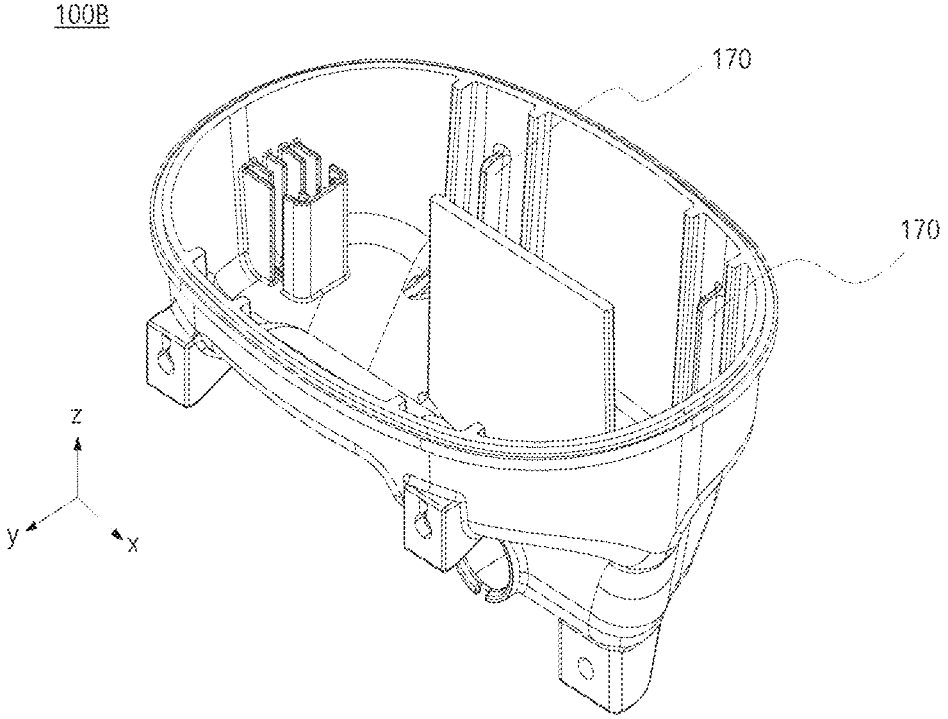
FIG. 10 is a perspective view illustrating the lower housing according to one embodiment of the present disclosure.
Figure 11:
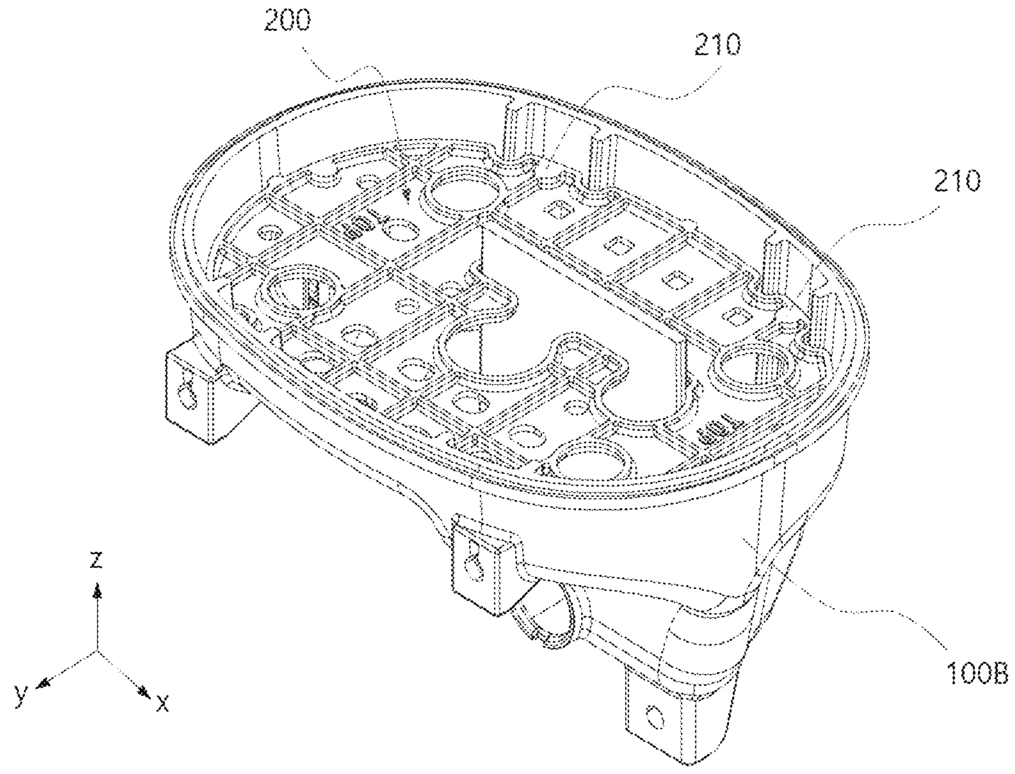
FIG. 11 is a view illustrating a state in which the lower housing is coupled to the baffle according to one embodiment of the present disclosure.

FIG. 10 illustrates an example in which the inner circumference of the lower housing 100B is provided in an elliptical shape, and FIG. 9 illustrates as an example in which the circumference of the baffle 200 is provided in an elliptical shape to correspond to the inner circumference of the lower housing 100B so that the baffle 200 may be inserted into the lower housing 100B.

Such a shape is merely illustrative, and the circumference of the baffle 200 may be determined according to the inner circumference of the lower housing 100B. That is, the circumference of the baffle 200 may be formed to correspond to the inner circumference of the lower housing 100B, and thus the baffle 200 may be coupled to the lower housing 100B in the height direction.

As illustrated in FIG. 9, the baffle 200 may be formed in a thin plate shape to prevent air of the upper space P1 from flowing into the lower space P2, which will be described with reference back to FIG. 6.

As illustrated in FIG. 6, the baffle 200 may be disposed inside the housing 100 to partition the inside of the housing into the upper space P1 positioned above the baffle 200 and the lower space P2 positioned under the baffle 200.

When it is not an abnormal situation, the lower space P2 is filled with coolant, and the upper space P1 is partially filled with coolant and partially filled with air. That is, when it is not an abnormal situation, the baffle 200 may be kept immersed in the coolant. This is because it is preferable that the level of the coolant stored inside the reservoir tank 1000 is positioned above the baffle 200 in terms of noise reduction.

Meanwhile, to circulate the coolant stored inside the reservoir tank, the coolant may be discharged through the outlet 120 formed in the lower housing 100B, and at this time, a pump may be connected to the outlet 120 to circulate the coolant.

However, when the coolant is discharged from the reservoir tank using the pump, a problem that the air filled in the upper space P1 inside the reservoir tank is mixed together and discharged may occur, resulting in a problem that coolant circulation performance is deteriorated.

According to one embodiment of the present disclosure, by providing the baffle 200 inside the housing 100 and keeping the baffle 200 immersed in the coolant, it is possible to prevent the air in the upper space P1 from being mixed with the coolant and discharged through the outlet 120, thereby improving coolant circulation performance.

Hereinafter, a method of coupling the baffle 200 to the lower housing 100B will be described with reference back to FIGS. 9 to 11.

As illustrated in FIG. 9, a plurality of slots 210 having a predetermined depth upward (a +z direction) may be formed in the baffle 200, and as illustrated in FIG. 10, a plurality of protrusions 170 protruding from an inner wall to the inside of the housing may be formed in the lower housing 100B. The plurality of protrusions 170 may each be inserted into one of the plurality of slots 210 to couple the lower housing 100B to the baffle 200.

Meanwhile, a coolant module according to one embodiment of the present disclosure may include the reservoir tank 1000 and the pump that circulates the coolant stored in the reservoir tank. The pump may be formed to communicate with the coolant outlet of the reservoir tank so that coolant discharged through the outlet flows directly into the pump.

The form in which the coolant outlet of the reservoir tank communicates with the pump may be a form in which a valve is provided between the coolant outlet of the reservoir tank and the pump to communicate with each other through the valve so that coolant flows from the reservoir tank to the pump inlet through the valve, or a form in which the coolant outlet of the reservoir tank is directly connected to the pump so that the coolant flows from the reservoir tank to the pump inlet. As described above, when the pump is connected to the coolant outlet of the reservoir tank, a volume of the coolant module can be reduced so that the coolant module may be mounted in the narrow engine room.

According to one embodiment of the present disclosure, it is possible to improve the level control convenience of the coolant of the reservoir tank and improve manufacturing convenience.

According to another embodiment of the present disclosure, it is possible to improve the coolant circulation performance of the coolant module.

Although the embodiments of the present disclosure have been described above with reference to the accompanying drawings, those skilled in the art to which the present disclosure pertains will understand that the present disclosure can be carried out in other specific forms without changing the technical spirit or essential features thereof. Accordingly, it should be understood that the above-described embodiments are illustrative and not restrictive in all aspects.

DESCRIPTION OF REFERENCE NUMERALS

1000: reservoir tank
100: housing
100A: upper housing
100B: lower housing
110: inlet
120: outlet
140: installation part
150: guide
160: bracket
170: protrusion
200: baffle
210: slot
300: water level sensor
310: sensing member
320: floating member
800: coolant injection port
900: mounting part

What is claimed is:

1. A reservoir tank that detects a level of stored coolant, comprising:

a housing forming a body of the reservoir tank and storing the coolant therein;

a baffle disposed inside the housing to partition an internal space of the housing into an upper space and a lower space; and a water level sensor that detects a level of the coolant, wherein the water level sensor has a floating member that moves upward and downward according to the level of the coolant and a sensing member that detects the floating member, wherein the upward movement of the floating member is restricted by the baffle, wherein the housing includes a lower housing forming a lower portion of the body of the reservoir tank and an upper housing forming an upper portion of the body of the reservoir tank, wherein the baffle is disposed inside the housing, wherein the sensing member is installed on at least a part of an outer surface of the lower housing, wherein a guide that guides the upward and downward movement of the floating member is formed on an inner surface of the lower housing, wherein the guide is formed on the inner surface of the lower housing corresponding to a part on which the sensing member is installed, wherein the guide is formed to extend vertically in a height direction from the inner surface of the lower housing, and wherein the guide is formed to extend to a position at which the baffle is disposed so that one surface of the baffle is in contact with an end of the guide.

2. The reservoir tank of claim 1, wherein an inlet into which the coolant flows is formed in the upper housing, and an outlet through which the coolant is discharged is formed in the lower housing.

3. The reservoir tank of claim 1, wherein a circumference of the baffle is formed to correspond to an inner circumference of the lower housing so that the baffle is coupled to the lower housing in a height direction.

4. The reservoir tank of claim 1, wherein the upper housing is coupled to the lower housing in a height direction.

5. The reservoir tank of claim 1, wherein a mounting part to be coupled to a vehicle is formed in the lower housing.

6. A coolant module, comprising:

the reservoir tank of claim 1; and a pump that circulates coolant stored in the reservoir tank.

7. The coolant module of claim 6, wherein the pump communicates with an outlet of the reservoir tank, and a level of the coolant of the reservoir tank is maintained to be greater than a height of the baffle.

8. A reservoir tank that detects a level of stored coolant, comprising:

a housing forming a body of the reservoir tank and storing the coolant therein;

a baffle disposed inside the housing to partition an internal space of the housing into an upper space and a lower space; and a water level sensor that detects a level of the coolant, wherein the water level sensor has a floating member that moves upward and downward according to the level of the coolant and a sensing member that detects the floating member, wherein the upward movement of the floating member is restricted by the baffle, wherein the housing includes a lower housing forming a lower portion of the body of the reservoir tank and an upper housing forming an upper portion of the body of the reservoir tank, wherein the baffle is disposed inside the housing, wherein an inlet into which the coolant flows is formed in the upper housing, and an outlet through which the coolant is discharged is formed in the lower housing, and wherein, when a length of the sensing member to detect the floating member is L and a height from a part on which the baffle is installed to a surface on which the sensing member is installed is H, H is smaller than L.

9. The reservoir tank of claim 2, wherein a bracket that fixes the sensing member is formed on an outer surface of the lower housing, and at least a part of the sensing member is fitted into the bracket.

10. The reservoir tank of claim 8, wherein the baffle is formed in a thin plate shape to prevent air of the upper space from being mixed with coolant and discharged through the outlet.

11. The reservoir tank of claim 8, wherein a plurality of protrusions protruding from the inner wall to an inside of the lower housing are formed in the lower housing, and a plurality of slots having a predetermined depth upward are formed in the baffle, and the plurality of protrusions are each inserted into one of the plurality of slots to couple the lower housing to the baffle.

* * * * *